United States Patent
Chen et al.

(10) Patent No.: US 12,432,481 B2
(45) Date of Patent: Sep. 30, 2025

(54) HEADPHONE AND HEADPHONE STATE DETECTION METHOD

(71) Applicant: Lanto Electronic Limited, Kunshan (CN)

(72) Inventors: Hsin-Nan Chen, Kunshan (CN); Tsung-Pao Hsu, Kunshan (CN); Jung-Pin Chien, Kunshan (CN); Yao-Chun Tsai, Kunshan (CN); Che-Yung Huang, Kunshan (CN)

(73) Assignee: LANTO ELECTRONIC LIMITED, Kunshan (CN)

(*) Notice: Subject to any disclaimer, the term of this patent is extended or adjusted under 35 U.S.C. 154(b) by 232 days.

(21) Appl. No.: 18/215,683

(22) Filed: Jun. 28, 2023

(65) Prior Publication Data
US 2024/0205583 A1 Jun. 20, 2024

(30) Foreign Application Priority Data
Dec. 20, 2022 (CN) .......................... 202211641400.1

(51) Int. Cl.
*H04R 1/10* (2006.01)
*G01S 15/04* (2006.01)
*G08C 23/02* (2006.01)

(52) U.S. Cl.
CPC ............ *H04R 1/1041* (2013.01); *G01S 15/04* (2013.01); *G08C 23/02* (2013.01); *H04R 1/1008* (2013.01)

(58) Field of Classification Search
CPC ..... H04R 1/1041; H04R 1/1008; G01S 15/04; G08C 23/02
See application file for complete search history.

(56) References Cited

U.S. PATENT DOCUMENTS

| | | | |
|---|---|---|---|
| 2019/0110121 A1* | 4/2019 | Sapozhnykov | H04R 1/1041 |
| 2020/0014996 A1* | 1/2020 | Kumari | H04R 1/1041 |
| 2021/0014600 A1 | 1/2021 | Neumaier et al. | |
| 2022/0295183 A1* | 9/2022 | Chen | H04R 1/1091 |

FOREIGN PATENT DOCUMENTS

| | | |
|---|---|---|
| CN | 101232743 A | 7/2008 |
| CN | 104661153 B | 2/2018 |
| CN | 103581796 B | 6/2018 |
| CN | 108737921 A | 11/2018 |
| CN | 109348352 A | 2/2019 |

(Continued)

*Primary Examiner* — Simon King
(74) *Attorney, Agent, or Firm* — Birch, Stewart, Kolasch & Birch, LLP

(57) ABSTRACT

A headphone and a headphone state detection method are provided. A signal processor receives a sensed signal generated by a sensing unit, and determines a contact state based on the sensed signal. In response to that the contact state is in no contact, the signal processor sequentially sends a plurality of pieces of code information to a first sound playing unit such that the first sound playing unit plays a plurality of first audio signals corresponding to the code information according to a playing sequence, and determines a wearing state of a headphone according to a plurality of first time points when a first audio receiving unit receives the first audio signals subjected to first reflection. In response to that the contact state is in contact, the signal processor stops sending the code information.

19 Claims, 9 Drawing Sheets

(56) References Cited

FOREIGN PATENT DOCUMENTS

| | | | |
|---|---|---|---|
| CN | 111800687 | A | 10/2020 |
| CN | 111988690 | A | 11/2020 |
| CN | 110099324 | B | 4/2021 |
| CN | 112911438 | A | 6/2021 |
| CN | 113453112 | A | 9/2021 |
| EP | 3 742 756 | A1 | 11/2020 |
| EP | 3 764 656 | A1 | 1/2021 |
| WO | WO 2022/048334 | A1 | 3/2022 |

* cited by examiner

HEADPHONE AND HEADPHONE STATE DETECTION METHOD

CROSS-REFERENCE TO RELATED APPLICATION

This non-provisional application claims priority under 35 U.S.C. § 119(a) to Patent Application No. 202211641400.1 filed in China, P.R.C. on Dec. 20, 2022, the entire contents of which are hereby incorporated by reference.

BACKGROUND

Technical Field

The present invention relates to a headphone technology, and particularly to a headphone and headphone state detection method related to detection of a wearing state of a headphone.

Related Art

There are two kinds of noise sources of a headphone product. One is an electrical noise produced by an internal circuit or an external signal, which can be effectively suppressed and canceled by a manufacturer by circuit design. The other is referred to as an audio noise (environmental noise) that may affect the comfort level of a headphone user in listening to music, and Active Noise Cancellation (ANC) is generally used to improve the environmental noise. A conventional digital ANC system samples environmental noises around through a detection microphone, performs signal processing to generate a signal to cancel the environmental noises, and sends the audio signal opposite in phase to these noises through a loudspeaker, thereby canceling the external environmental noises.

In general, an ANC system keeps monitoring sounds reaching ears through a detection microphone in a headphone housing, and an output signal of the detection microphone is amplified and digitalized by an analog-to-digital converter, and then is sent to a Digital Noise Cancellation (DNC) processor. A signal from a music source is digitalized by the analog-to-digital converter, and then is processed by a digital equalizer to obtain a proper frequency characteristic. Then, the signal enters the DNC processor, and the DNC processor removes an environmental noise from the signal of the music source, and extracts a noise to be canceled. Phase reversal is performed on the extracted noise to be canceled, and a processed signal result is played back together with the music signal through a driver, thereby canceling the noise before the noise reaches the ears.

A headphone with an ANC system generally needs a battery or another power supply for operation. In such case, power often continues to be consumed if a user takes down but does not turn off the headphone. In addition, it is expected that the ANC system may be notified in advance to be pre-started for preparation before the user wears the headphone. Therefore, how to effectively detect a state of a headphone is a subject that needs to be studied.

SUMMARY

In view of this, some embodiments of the present invention provide a headphone and a headphone state detection method, to improve the problems of the conventional art.

Some embodiments of the present invention provide a headphone, including a first sound playing unit, a first audio receiving unit, a sensing unit, and a signal processor. The first sound playing unit is configured to execute an operation of playing, in response to receiving a plurality of pieces of code information, a plurality of first audio signals corresponding to the code information according to a playing sequence. The sensing unit is configured to generate a sensed signal. The signal processor is configured to execute operations of: determining a contact state based on the sensed signal; in response to that the contact state is in no contact, sequentially sending the code information; determining a wearing state of the headphone according to a plurality of first time points when the first audio receiving unit receives the first audio signals subjected to first reflection, wherein any two pieces of continuously sent code information among the code information are in correspondence to different frequencies; and in response to that the contact state is in contact, stopping sending the code information.

Some embodiments of the present invention provide a headphone state detection method, applied to a headphone. The headphone includes a first sound playing unit, a first audio receiving unit, a sensing unit, and a signal processor. The headphone state detection method includes the following steps performed by the signal processor: receiving a sensed signal generated by the sensing unit; determining a contact state based on the sensed signal; and in response to that the contact state is in no contact, sequentially sending a plurality of pieces of code information to the first sound playing unit such that the first sound playing unit plays a plurality of first audio signals corresponding to the code information according to a playing sequence, and determining a wearing state of the headphone according to a plurality of first time points when the first audio receiving unit receives the first audio signals subjected to first reflection, wherein any two pieces of continuously sent code information among the code information are in correspondence to different frequencies, and in response to that the contact state is in contact, stopping sending the code information.

Some embodiments of the present invention provide a headphone, including a first sound playing unit, a first audio receiving unit, a sensing unit, and a signal processor. The first sound playing unit is configured to execute an operation of playing a test audio signal in response to receiving test information. The sensing unit is configured to generate a sensed signal. The signal processor is configured to execute operations of determining a contact state based on the sensed signal, and in response to that the contact state is in no contact, sending the test information, and determining a state of the headphone according to a spectrum of a reflected test audio signal received by the first audio receiving unit.

Based on the above, some embodiments of the present invention provide a headphone and a headphone state detection method. When the sensing unit senses that the headphone is in no contact, the wearing state of the headphone is determined according to the plurality of first time points when the first audio receiving unit receives the first audio signals subjected to first reflection. When the headphone is in contact, the code information is stopped to be sent. Therefore, the state of the headphone may be determined effectively, and mistaken contacts of the sensing unit and the power consumption of the whole headphone may be reduced. Some embodiments of the present invention provide a headphone whose state may be determined based on the spectrum of the reflected test audio signal received by the first audio receiving unit.

Detailed descriptions will be made to the present invention below in combination with the drawings and specific embodiments, but not as limitations on the present invention.

BRIEF DESCRIPTION OF THE DRAWINGS

FIG. 3-1 is a schematic diagram of operation of a headphone according to an embodiment of the present invention.

FIG. 3-2 is a schematic diagram of a test audio signal according to an embodiment of the present invention.

FIG. 3-3 is a schematic diagram of a reflected test audio signal according to an embodiment of the present invention.

FIG. 7-1 is a flowchart of a headphone state detection method according to an embodiment of the present invention.

FIG. 7-2 is a flowchart of a headphone state detection method according to an embodiment of the present invention.

DETAILED DESCRIPTION

Figure 1:
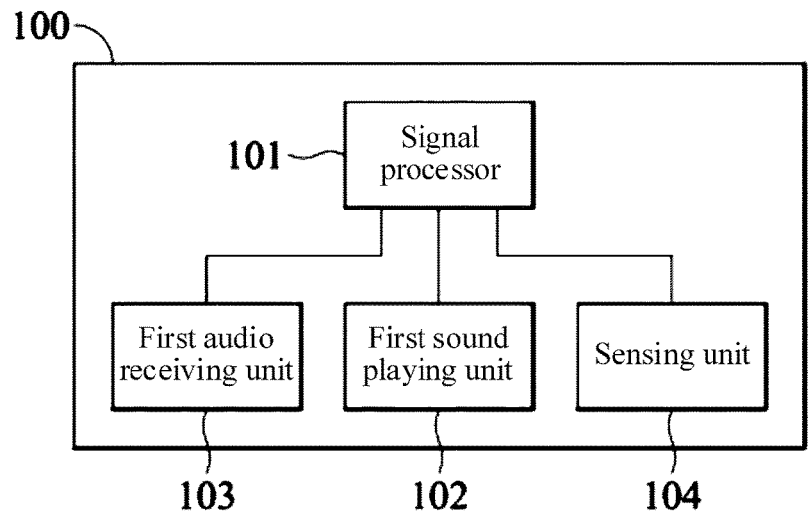
FIG. 1 is a block diagram of a headphone system according to an embodiment of the present invention.

The above and other technical contents, features, and effects of the present invention will be presented clearly in the following detailed descriptions of the embodiments made with reference to the drawings. The thickness or size of each component in the drawings is presented exaggeratively, elliptically, or roughly for those skilled in the art to understand and read. The size of each component is not exactly its actual size and not intended to limit implementation of the present invention, and therefore is of no practical technical significance. Any structural modifications, changes of the proportional relationship, or regulation of the sizes shall fall within the scope of the technical contents disclosed in the present invention without affecting achievable effects and objectives of the present invention. The same reference numerals in all of the drawings are used to represent the same or similar components. Term "connect" mentioned in the following embodiments may refer to any direct or indirection connection means.

FIG. 1 is a block diagram of a headphone system according to an embodiment of the present invention. Referring to FIG. 1, a headphone 100 includes a signal processor 101, a first sound playing unit 102, a first audio receiving unit 103, and a sensing unit 104. In this embodiment, the first sound playing unit 102 may be an existing loudspeaker of the headphone, and the first audio receiving unit 103 may be an existing feedback microphone of the headphone with an ANC system. The sensing unit 104 is configured to generate a sensed signal reflecting a contact state of the headphone 100.

In general, the first sound playing unit 102 plays a headphone audio signal which may be generated by an audio source during audio playing of various devices, such as a media player, a computer, a radio, a mobile phone, a Compact Disc (CD) player, or a game console. For example, a user connects the headphone 100 to a portable media player of a song selected by the user so as to receive a headphone audio signal (such as the song currently played by the portable media player), and the first sound playing unit 102 outputs an acoustic signal of the headphone audio signal. The first audio receiving unit 103 samples the acoustic signal output by the first sound playing unit 102 and an environmental acoustic signal at the first sound playing unit 102.

The sensing unit 104 is arranged at a fixed position of the headphone 100. The sensing unit 104 contacts with an object to generate the sensed signal. The signal processor 101 receives the sensed signal, and determines a contact state of the headphone 100 based on the presence/absence or content of the sensed signal. That is, the signal processor 101 determines the contact state based on the sensed signal. In some embodiments of the present invention, the sensing unit 104 is arranged at a position where the headphone 100 may be touched by a person who wears the headphone 100 normally. In some embodiments of the present invention, the sensing unit 104 includes a capacitive sensing circuit. The capacitive sensing circuit includes two plates of which one forms a grounding layer and the other includes a metal layer. The metal layer and the grounding layer form a capacitor. According to a capacitive sensing principle, a voltage of the capacitor changes when the metal layer is squeezed or contacts with a conductor (such as human skin). By detecting whether the voltage changes or whether the sensed signal is generated, the signal processor 101 may determine whether the sensing unit 104 contacts with the object to further determine the contact state of the headphone 100.

The signal processor 101 is configured to receive an external command, and edit and store audios of different frequencies as codes according to time codes 1, 2, 3 . . . M, as shown in Table (1), M being a positive integer.

TABLE 1

| Audio | 45 kHz | 55 kHz | 65 kHz | 75 kHz | 85 kHz | 95 kHz |
|---|---|---|---|---|---|---|
| Time code 1 | 1A | 1B | 1C | 1D | 1E | 1F |
| Time code 2 | 2A | 2B | 2C | 2D | 2E | 2F |
| . | . | . | . | . | . | . |
| . | . | . | . | . | . | . |
| Time code 10 | 10A | 10B | 10C | 10D | 10E | 10F |

The frequencies of the audios corresponding to the same time code are different from each other, and the frequencies of any two continuously sent audios are different. For example, in Table (1), codes 1A, 1B . . . 1F corresponding to time code 1 correspond to different frequencies of audios. Any two pieces of continuously sent code information correspond to different frequencies of audios. For example, frequencies corresponding to continuously sent codes 1A and 1B are 45 kHz and 55 kHz respectively, and frequencies corresponding to continuously sent codes 1F and 2A are 95 kHz and 45 kHz respectively.

In this embodiment, the signal processor 101 receives an external command, and edits and stores audios of frequencies 45 kHz, 55 kHz, 65 kHz, 75 kHz, 85 kHz, and 95 kHz as codes 1A, 1B . . . 10F according to time codes 1, 2, 3 . . . 10. In this embodiment, the signal processor 101 also receives an external command, and edits and stores a test signal. The test signal may be of multiple forms. In some embodiments of the present invention, the test signal includes at least one single-frequency signal. The single-frequency signal refers to an audio of a single frequency. The test signal includes audios of 4 single-frequency signals of 45 kHz, 75 kHz, 85 kHz, and 95 kHz. In some embodiments of the present invention, the test signal includes a continuous-frequency signal.

In some embodiments, frequencies corresponding to codes 1A, 1B . . . 1F may change according to a requirement and an actual situation (such as an applicable frequency range of the first sound playing unit 102). For example, the frequencies corresponding to codes 1A, 1B . . . 1F may be 5 kHz, 10 kHz, 15 kHz, 25 kHz, 35 kHz, and 45 kHz. The test signal includes audios of 5 kHz, 25 kHz, and 45 kHz.

In some embodiments, the signal processor 101 generates and sends code information of codes 1A, 1B . . . 10F according to a default rule under some triggering conditions (which will further be described in the following embodiments). For example, according to the default rule under some triggering conditions, the signal processor 101 generates and sends code information of codes 1A, 1B . . . 1F in a period corresponding to time code 1, generates and sends code information of codes 2A, 2B . . . 2F in a period corresponding to time code 2, and so on. In some embodiments, the signal processor 101 starts again to send codes 1A, 1B . . . 10F after completing sending codes 1A, 1B . . . 10F (such as after sending code 10F). In some embodiments, the signal processor 101 starts again to send codes 1A, 1B . . . 10F after a pause of preset time after completing sending codes 1A, 1B . . . 10F (such as after sending code 10F).

In some embodiments, contents of code 1A to code 1F are the same as those of code 2A to code 2F respectively. For example, code 1A and code 2A have the same code information of 45 kHz, code 1B and code 2B have the same code information of 55 kHz, and code 1F and code 2F have the same code information of 95 kHz. By parity of reasoning, the contents of code 1A to code 1F are the same as those of code 10A to code 10F respectively. That is, code information of the same frequency corresponding to different time codes is the same. In some embodiments, contents of code 1A to code 1F are different from those of code 2A to code 2F respectively. For example, code 1A and code 2A are of 45 kHz but have different code information, code 1B and code 2B are of 55 kHz but have different code information, and code 1F and code 2F are of 95 kHz but have different code information. By parity of reasoning, the contents of code 1A to code 1F are different from those of code 10A to code 10F respectively. That is, code information of the same frequency corresponding to different time codes is different.

In some embodiments, the signal processor 101 sends test information of a test signal under some triggering conditions (which will further be described in the following embodiments). The test information is information of at least one single-frequency signal in the test signal, and is stored and transmitted digitally.

Figure 2:
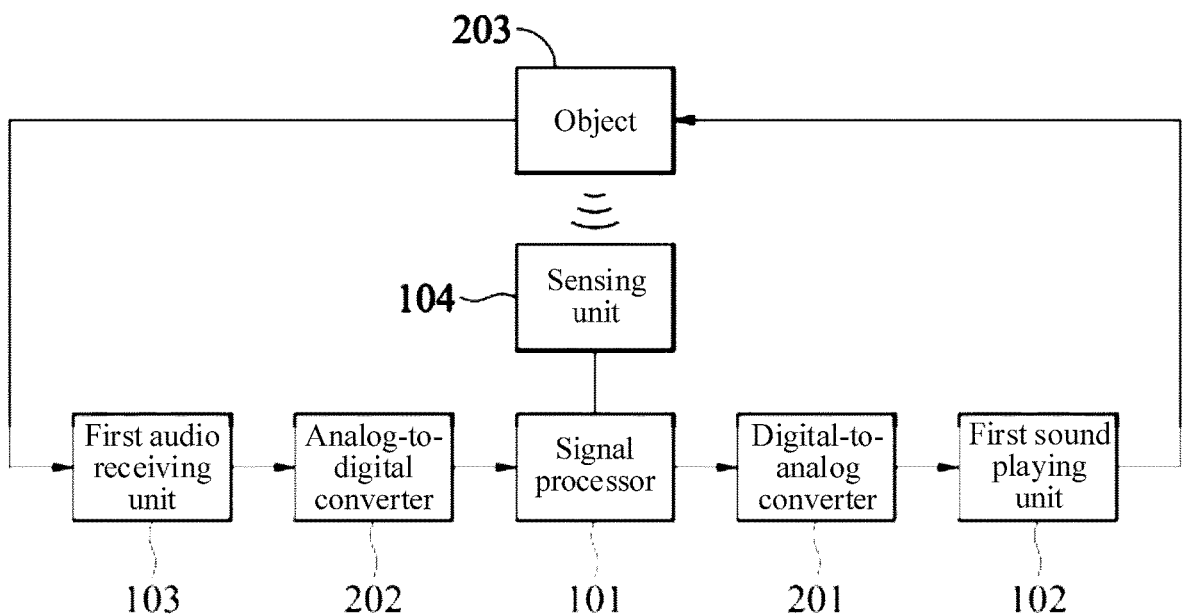
FIG. 2 is a schematic diagram of an operation process of a headphone according to an embodiment of the present invention.
Figures 1, 3:
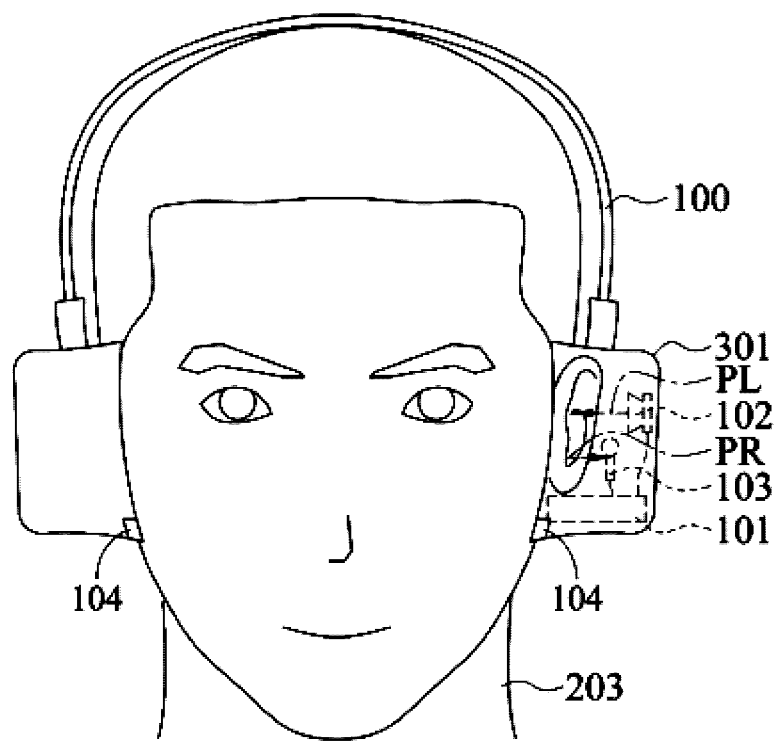
Figures 2, 3:
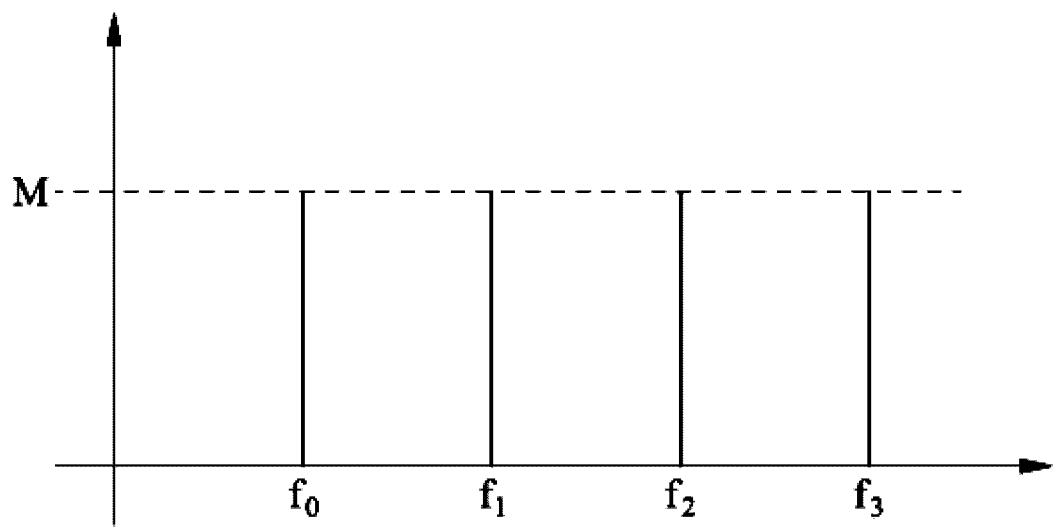
Figure 3:
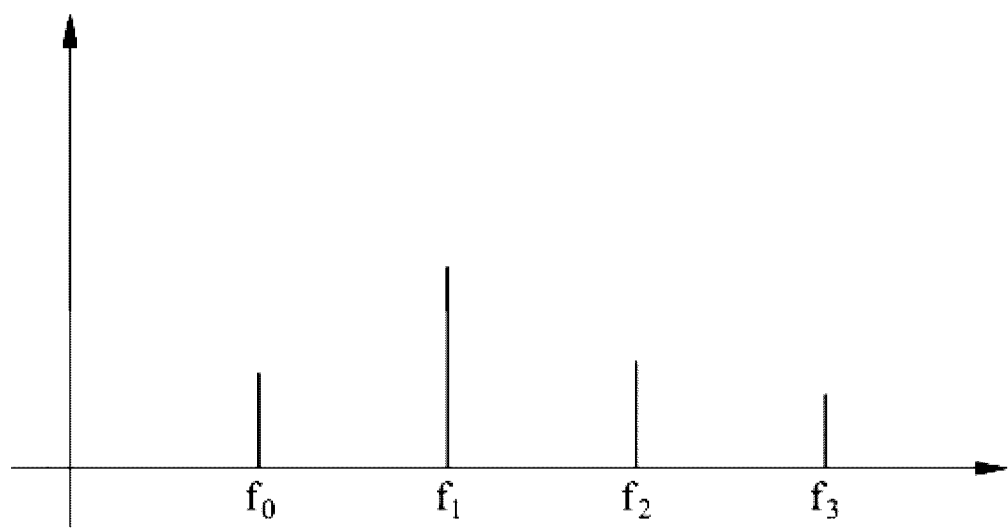
Figure 4:
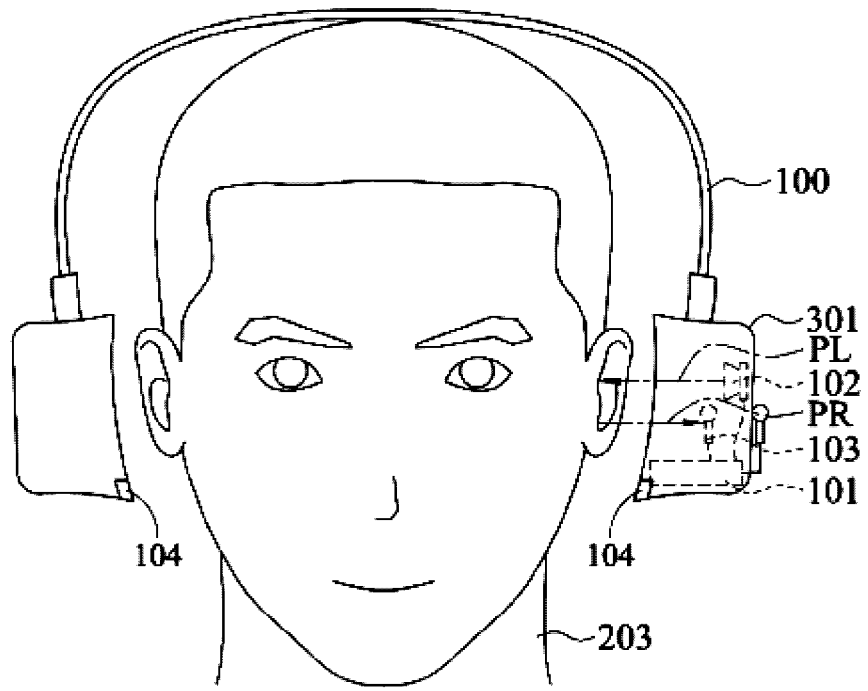
FIG. 4 is a schematic diagram of operation of a headphone according to an embodiment of the present invention.

FIG. 2 is a schematic diagram of an operation process of a headphone according to an embodiment of the present invention. FIG. 3-1 is a schematic diagram of operation of a headphone according to an embodiment of the present invention. FIG. 4 is a schematic diagram of operation of a headphone according to an embodiment of the present invention. Referring to FIGS. 2, 3-1, and 4 together, the signal processor 101, the first sound playing unit 102, and the first audio receiving unit 103 are arranged in a headphone housing 301. The sensing unit 104 is arranged a position on the headphone housing 301, and the position on the headphone housing 301 may be touched by a person who wears the headphone 100 normally. It is to be noted that the signal processor 101 is presented to be arranged in the headphone 301 corresponding to the left ear in FIGS. 2 and 3-1, but in another embodiment, the signal processor 101 may be arranged in the headphone housing corresponding to the left ear, the right ear, or both ears. Certainly, the sensing unit 104 is arranged on the headphone housing corresponding to both ears in FIGS. 2 and 3-1, but in another embodiment, the sensing unit 104 is arranged on the headphone housing corresponding to only one ear. No limits are made in the present invention.

The signal processor 101 sends code information according to codes 1A, 1B . . . 10F under some triggering conditions. The code information is converted into an analog form by a digital-to-analog converter 201, and then is transmitted to the first sound playing unit 102. The first sound playing unit 102 injects a corresponding audio signal into the headphone audio signal according to the received code information. For example, the signal processor 101 sends the code information corresponding to code 2A to the first sound playing unit 102, and the first sound playing unit 102 injects an audio signal of 45 kHz into the headphone audio signal after receiving the code information corresponding to code 2A. The signal processor 101 sends test information of a test signal under some triggering conditions, the test information being information of at least one single-frequency signal in the test signal. The test information is converted into an analog form by the digital-to-analog converter 201, and then is transmitted to the first sound playing unit 102. The first sound playing unit 102 injects a corresponding audio signal, referred to as a test audio signal, into the headphone audio signal according to the received test information. For example, in some embodiments of the present invention, the test signal includes audios of 45 kHz, 75 kHz, 85 kHz, and 95 kHz, and the test information includes information of the audios of 45 kHz, 75 kHz, 85 kHz, and 95 kHz. In such case, the first sound playing unit 102 injects a test audio signal including audios of 45 kHz, 75 kHz, 85 kHz, and 95 kHz into the headphone audio signal after receiving the test information.

Referring to FIGS. 3-1 and 4, the audio signal (such as the audio signal of 45 kHz or the audio signal injected by the first sound playing unit 102 based on the test information and including the audios of 45 kHz, 75 kHz, 85 kHz, and 95 kHz) is propagated through a path PL and reflected through a path PR after encountering an object 203. When sampling the environmental acoustic signal, the first audio receiving unit 103 transmits the sampled acoustic signal to the signal processor 101 through an analog-to-digital converter 202. The signal processor 101 detects the audio signal subjected to reflection in the environmental acoustic signal from the first audio receiving unit 103, and obtains a time point when the first audio receiving unit 103 receives the audio signal subjected to reflection.

The signal processor 101 may compare a time point when the first sound playing unit 102 sends the audio signal with the time point when the signal processor 101 detects the audio signal subjected to reflection, thereby obtaining a time difference. The signal processor 101 may obtain a sum of distances between the first sound playing unit 102 and the object 203 and between the object 203 and the first audio receiving unit 103 by use of an equation: distance=sound velocity*time difference. Since the first sound playing unit 102 and the first audio receiving unit 103 are arranged at fixed positions of the headphone, the signal processor 101 may obtain a distance between the headphone 100 and the object 203. For example, the first sound playing unit 102 and the first audio receiving unit 103 are arranged at proper positions, so that a preset distance between the first sound playing unit 102 and the object 203 is the same as that between the first audio receiving unit 103 and the object 203. In such case, the distance between the first sound playing unit 102 and the object 203 is sound velocity*time difference/2. Moreover, the distance between the headphone 100 and the object 203 may be set to that between the first sound playing unit 102 and the object 203.

For the test audio signal, the signal processor 101 detects the test audio signal subjected to reflection in the environmental acoustic signal from the first audio receiving unit 103. For ease of description, the test audio signal subjected to reflection is referred to as a reflected test audio signal. The signal processor 101 may perform Fourier analysis on the detected reflected test audio signal to obtain a spectrum of the reflected test audio signal.

FIG. 3-2 is a schematic diagram of a test audio signal according to an embodiment of the present invention. FIG. 3-3 is a schematic diagram of a reflected test audio signal according to an embodiment of the present invention. Referring to FIGS. 3-2 and 3-3 together, in some embodiments of the present invention, the test signal includes audios of 45 kHz, 75 kHz, 85 kHz, and 95 kHz, and amplitudes of the audios of all the frequencies are the same. The test audio signal may be shown in FIG. 3-2, where M represents amplitudes of the audios of 45 kHz, 75 kHz, 85 kHz and 95 kHz, and $f_0$, $f_1$, $f_2$, and $f_3$ represent frequency values, namely, $f_0$=45 k, $f_1$=75 k, $f_2$=85 k, and $f_3$=95 k respectively. FIG. 3-2 shows a spectrum of the test audio signal. Since each object may have a different sound absorbing coefficient, and sound absorbing coefficients of each object for audios of different frequencies may also be different, after the test audio signal is reflected by the object 203, an amplitude of the audio of each frequency in the reflected test audio signal may change. Fourier analysis may be performed on the reflected test audio signal to obtain FIG. 3-3. FIG. 3-3 shows a spectrum of the reflected test audio signal. The signal processor 101 determines whether the object 203 is a person based on amplitudes of single-frequency signals of different frequencies in the 4 single-frequency signals of 45 kHz, 75 kHz, 85 kHz, and 95 kHz and amplitudes of single-frequency signals in the spectrum of the reflected test audio signal corresponding to the frequencies of the 4 single-frequency signals, thereby determining whether the headphone 100 is worn by the person. In some embodiments of the present invention, the signal processor 101 calculates amplitude changes of the 4 single-frequency signals, and determines whether the object 203 is a person according to the amplitude changes of the 4 single-frequency signals, thereby determining whether the headphone 100 is worn by the person.

Taking FIGS. 3-2 and 3-3 as an example, if a sound absorbing capability of human skin for an audio of 75 kHz is lower than those for 45 kHz, 85 kHz, and 95 kHz, or a reflecting capability of human skin for an audio of 75 kHz is higher than those for 45 kHz, 85 kHz, and 95 kHz, by use of the reflected test audio signal, the signal processor 101 may obtain an amplitude attenuation of an amplitude corresponding to each frequency of the reflected test audio signal by comparison: the amplitude attenuation of the amplitude corresponding to $f_1$ after reflection is m1, and the amplitude attenuations of the amplitudes corresponding to frequency values $f_0$, $f_2$, and $f_3$ after reflection are m0, m2, and m3 respectively, where m1 is less than a preset attenuation threshold, m0, m2, and m3 are all greater than the preset attenuation threshold, and a frequency-amplitude distribution as shown in FIG. 3-2 is presented. Then, the signal processor 101 may determine accordingly that the headphone 100 is worn by the person. In the above example, if sound absorbing capabilities of a metal for 45 kHz, 75 kHz, 85 kHz, and 95 kHz are all lower than those of a human body for these frequencies, or reflecting capabilities of a metal for 45 kHz, 75 kHz, 85 kHz, and 95 kHz are higher than those of human skin for these frequencies, when the headphone 100 is close to or placed on a metal surface, the amplitude attenuations corresponding to $f_0$, $f_1$, $f_2$, and $f_3$ of the reflected test audio signal may be close and all less than the preset attenuation threshold, and the signal processor 101 may determine accordingly that the headphone 100 is not worn by the person but close to or placed on a non-human metal object or metal surface.

It is to be noted that, although the test signal includes 4 audio signals of 45 kHz, 75 kHz, 85 kHz, and 95 kHz in the above-mentioned embodiment, the test signal may also include audios of other numbers and other frequencies, and no limits are made in the present invention.

It is also to be noted that, although the amplitudes are shown in FIGS. 3-2 and 3-3, those of ordinary skill in the art the present invention belongs to may certainly use both the amplitude and the phase, and no limits are made in the present invention.

A headphone state detection method of the embodiments of the present invention and collaborative operation of each piece of hardware of the headphone 100 will now be described in detail in combination with the drawings.

Figures 1, 7:
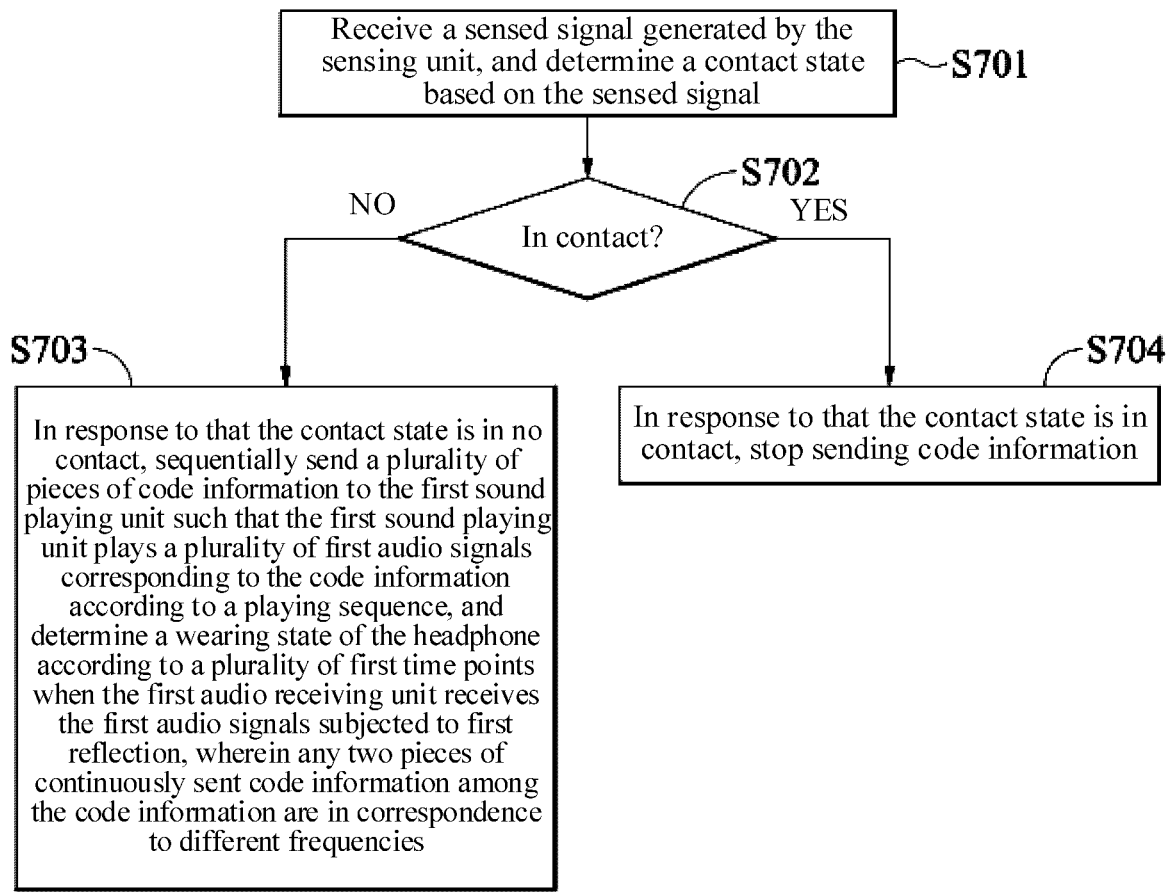
Figures 2, 7:
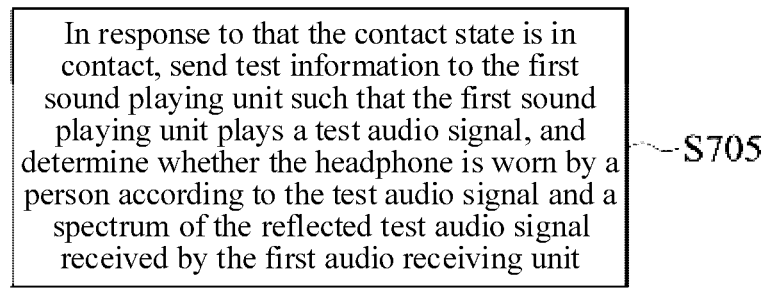

FIG. 7-1 is a flowchart of a headphone state detection method according to an embodiment of the present invention. References are made to FIGS. 1, 2, 3-1 to 3-3, 4, and 7-1. In the embodiment shown in FIG. 7-1, the headphone state detection method includes steps S701 to S704. In step S701, the signal processor 101 receives a sensed signal sensed by the sensing unit 104 so as to determine a contact state of the headphone 100 based on the sensed signal.

In step S702, the signal processor 101 obtains the contact state of the headphone 100 based on the received sensed signal sensed by the sensing unit 104 so as to determine whether the headphone 100 is in contact with an object. If NO, step S703 is performed. If YES, step S704 is performed.

In step S703, in response to that the contact state is in no contact, the signal processor 101 sequentially sends code information to the first sound playing unit 102 at a first preset time interval according to a playing sequence of 1A, 1B . . . 1F. For example, after sending code 1A, the signal processor 101 sends code 1B after the first preset time interval, and then sends code 1C after the first preset time interval, so as to sequentially send the code information until sending code 1F. In this embodiment, the first preset time interval is 1 second. The first sound playing unit 102 injects a corresponding audio signal into a headphone audio signal according to the received code information so as to play a plurality of first audio signals corresponding to the code information. After a second preset time interval, the signal processor 101 sequentially sends code information to the first sound playing unit 102 at the first preset time interval according to a playing sequence of 2A, 2B . . . 2F. In this embodiment, the second preset time interval is 1 second. The signal processor 101 repeats this process until code information corresponding to all codes is transmitted to the first sound playing unit 102. In some embodiments, the second preset time interval is time required by the signal processor 101 to sequentially send code 1A to code 1F at the first preset time interval.

Then, the first audio receiving unit 103 transmits a sampled acoustic signal to the signal processor 101 through the analog-to-digital converter 202. The signal processor 101 detects an audio signal subjected to reflection in an environmental acoustic signal from the first audio receiving unit 103, and obtains a plurality of first time points when the first audio receiving unit 103 receives the audio signals corresponding to codes 1A to 10F after reflection. In this embodiment, after the signal processor 101 sends first piece of code information (such as 2A), if the signal processor 101 detects no corresponding audio signal subjected to reflection (the audio signal of 45 kHz in this example) after the second preset time interval, the signal processor 101 adds the time point when the code information is sent and the second preset time interval to obtain a first time point when the audio signal corresponding to code 2A after reflection is received.

Next, the signal processor 101 determines a wearing state of the headphone 100 according to these first time points. In this embodiment, the audio signals of the same frequency corresponding to different time codes (such as the audio signals corresponding to codes 1A and 2A) may be played by the first sound playing unit 102 at a sufficient time interval, so that the signal processor 101 is unlikely to mix the audio signals corresponding to codes 1A and 2A although their frequencies are the same.

In step S704, in response to that the contact state is in contact, the signal processor 101 stops sending the code information.

FIG. 7-2 is a flowchart of a headphone state detection method according to an embodiment of the present invention. References are made to FIGS. 1, 2, 3-1 to 3-3, 4, 7-1, and 7-2. In the embodiment shown in FIG. 7-2, step S704 further includes step S705. In step S705, in response to that the contact state is in contact, the signal processor 101 sends test information of a test signal to the first sound playing unit 102 such that the first sound playing unit 102 plays a test audio signal. The signal processor 101 determines whether the object in contact with the headphone 100 is a person according to the test audio signal and a spectrum (as shown in FIGS. 3-2 and 3-3) of the reflected test audio signal received by the first audio receiving unit 103, thereby determining whether the headphone 100 is worn by the person.

Figure 8:
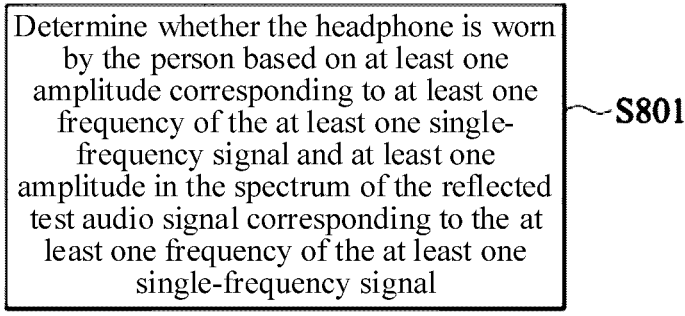
FIG. 8 is a flowchart of a headphone state detection method according to an embodiment of the present invention.

FIG. 8 is a flowchart of a headphone state detection method according to an embodiment of the present invention. References are made to FIGS. 1, 2, 3-1 to 3-3, 7-1, 7-2, and 8. In the embodiment shown in FIG. 8, the test signal includes at least one single-frequency signal (such as the audios of 45 kHz, 75 kHz, 85 kHz, and 95 kHz in the above-mentioned embodiment, in such case, the test information includes information of audios of 45 kHz, 75 kHz, 85 kHz, and 95 kHz), and step S705 includes step S801. In step S801, the signal processor 101 determines whether the object 203 is a person based on at least one amplitude (such as M recorded in FIG. 3-2) corresponding to at least one frequency (such as the above-mentioned 45 kHz, 75 kHz, 85 kHz, and 95 kHz) of the at least one single-frequency signal (such as the audios of 45 kHz, 75 kHz, 85 kHz, and 95 kHz in the above-mentioned embodiment) and at least one amplitude (such as the amplitude corresponding to each frequency in FIG. 3-3) in the spectrum (such as FIG. 3-3) of the reflected test audio signal corresponding to the at least one frequency (such as the above-mentioned 45 kHz, 75 kHz, 85 kHz, and 95 kHz) of the at least one single-frequency signal, thereby determining whether the headphone 100 is worn by the person.

Figure 9:
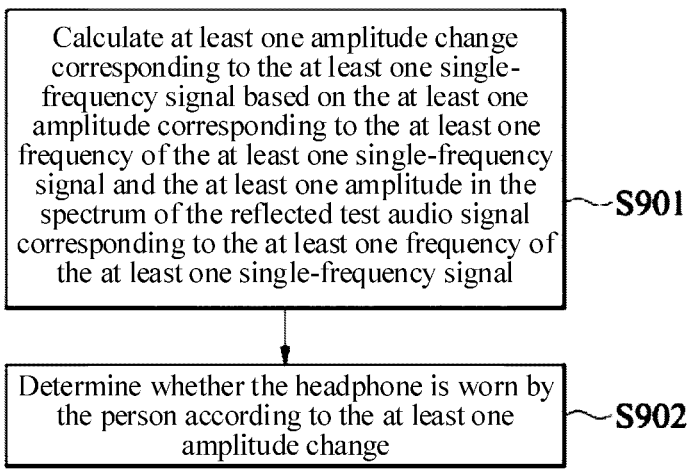
FIG. 9 is a flowchart of a headphone state detection method according to an embodiment of the present invention.

FIG. 9 is a flowchart of a headphone state detection method according to an embodiment of the present invention. References are made to FIGS. 1, 2, 3-1 to 3-3, 7-1, 7-2, 8, and 9. In the embodiment shown in FIG. 9, step S801 includes steps S901 and S902. In step S901, the signal processor 101 calculates at least one amplitude change corresponding to the at least one single-frequency signal before and after reflection based on the at least one amplitude (such as M recorded in FIG. 3-2) corresponding to the at least one frequency (such as the above-mentioned 45 kHz, 75 kHz, 85 kHz, and 95 kHz) of the at least one single-frequency signal (such as the above-mentioned audios of 45 kHz, 75 kHz, 85 kHz, and 95 kHz) and the at least one amplitude (such as the amplitude corresponding to each frequency in FIG. 3-3) in the spectrum (such as FIG. 3-3) of the reflected test audio signal corresponding to the at least one frequency (such as the above-mentioned 45 kHz, 75 kHz, 85 kHz, and 95 kHz) of the at least one single-frequency signal. For example, after a single-frequency signal of 45 kHz is reflected, the amplitude is attenuated by 60%; after a single-frequency signal of 75 kHz is reflected, the amplitude is attenuated by 5%; after a single-frequency signal of 85 kHz is reflected, the amplitude is attenuated by 50%; and after a single-frequency signal of 95 kHz is reflected, the amplitude is attenuated by 65%. In step S902, the signal processor 101 determines whether the object 203 is the person according to the at least one amplitude change, thereby determining whether the headphone 100 is worn by the person. In some embodiments, the signal processor 101 may obtain an amplitude attenuation of the amplitude corresponding to each frequency of the reflected test audio signal by comparison according to a preset attenuation threshold, so as to determine whether the headphone 100 is worn by the person. Taking FIGS. 3-2 and 3-3 as an example, if a sound absorbing capability of human skin for an audio of 75 kHz is lower than those for 45 kHz, 85 kHz, and 95 kHz, or a reflecting capability of human skin for an audio of 75 kHz is higher than those for 45 kHz, 85 kHz, and 95 kHz, the signal processor 101 may set the preset attenuation threshold to 15%. In such case, after a single-frequency signal of 45 kHz is reflected, the amplitude is attenuated by 60%; after a single-frequency signal of 75 kHz is reflected, the amplitude is attenuated by 5%; after a single-frequency signal of 85 kHz is reflected, the amplitude is attenuated by 50%; and after a single-frequency signal of 95 kHz is reflected, the amplitude is attenuated by 65%. Only an amplitude attenuation corresponding to 75 kHz is less than the preset attenuation threshold, and amplitude attenuations corresponding to 45 kHz, 85 kHz, and 95 kHz are all greater than the preset attenuation threshold, so that the signal processor 101 may determine accordingly that the headphone 100 is worn by the person. In the above example, if sound absorbing capabilities of a metal for 45 kHz, 75 kHz, 85 kHz, and 95 kHz are all lower than those of a human body for these frequencies, or reflecting capabilities of a metal for 45 kHz, 75 kHz, 85 kHz, and 95 kHz are higher than those of human skin for these frequencies, when the headphone 100 is close to or placed on a metal surface, the amplitude attenuations corresponding to 45 kHz, 75 kHz, 85 kHz, and 95 kHz of the reflected test audio signal are all between 5% an 10% and less than the preset attenuation threshold, so that the signal processor 101 may determine accordingly that the headphone 100 is not worn by the person but close to or placed on a non-human metal object or metal surface.

In some embodiments of the present invention, the signal processor 101 compares the maximum amplitude change with a required change of a human body to determine whether the object 203 is a human body.

Figure 10:
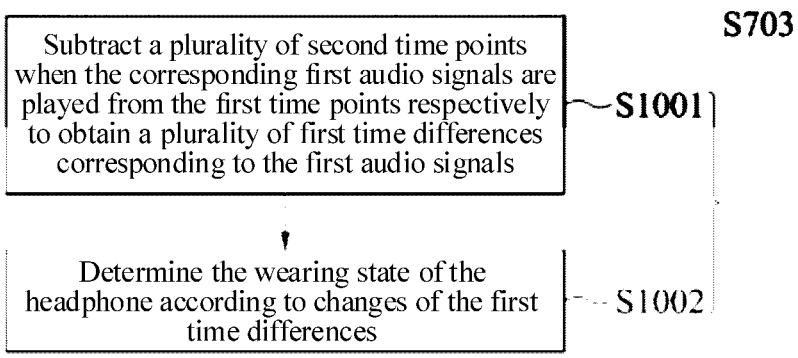
FIG. 10 is a flowchart of a headphone state detection method according to an embodiment of the present invention.

FIG. 10 is a flowchart of a headphone state detection method according to an embodiment of the present invention. Referring to FIG. 10, in some embodiments, step S703 further includes steps S1001 and S1002. In step S1001, when sending the code information corresponding to codes 1A, 1B . . . 10F, the signal processor 101 stores a plurality of second time points when the code information is sent, and then subtracts the second time points corresponding to the same code from the first time points respectively to obtain a plurality of first time differences. In step S1002, the signal processor 101 determines the wearing state of the headphone 100 according to changes of these first time differences.

Figure 11:
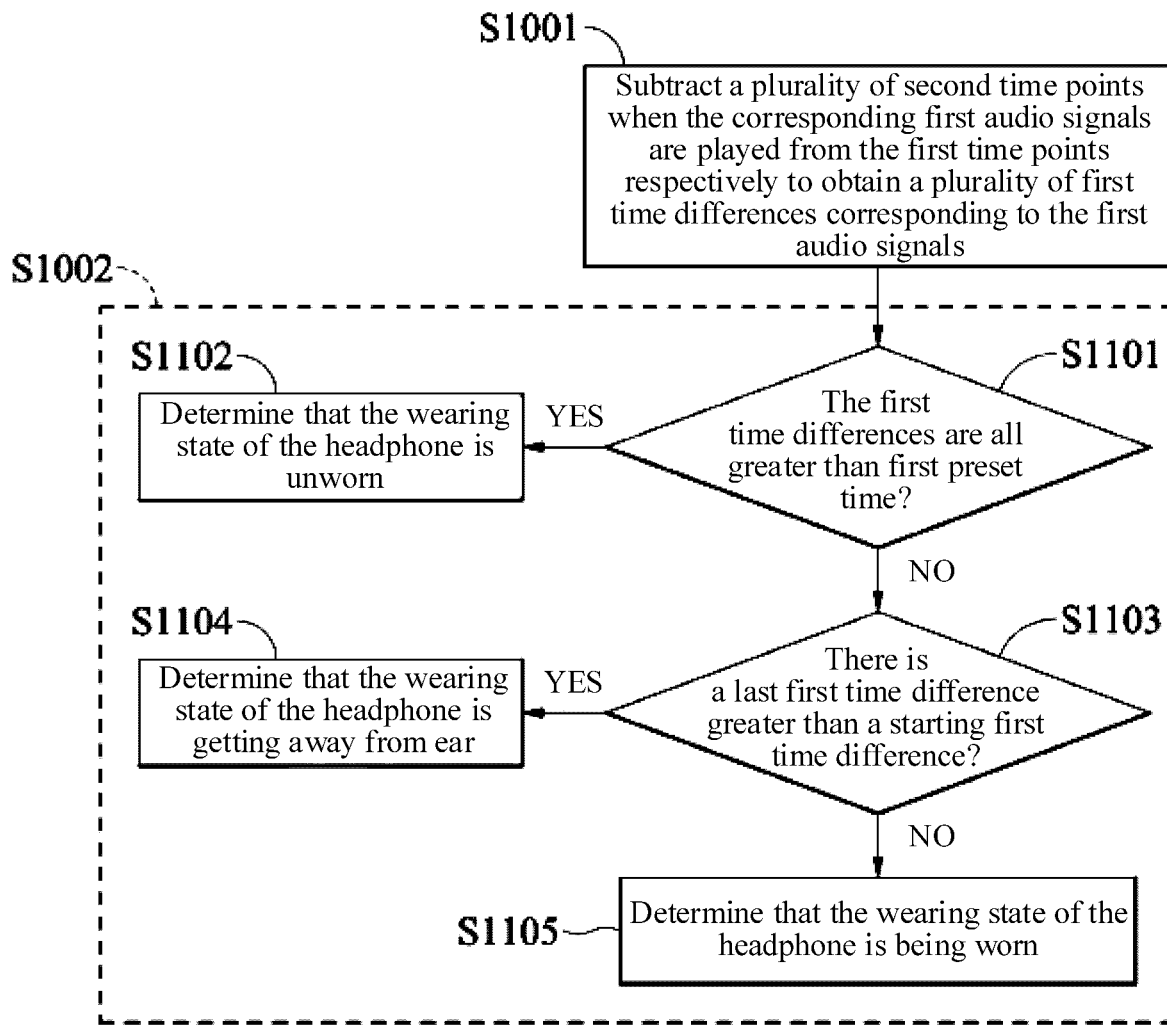
FIG. 11 is a flowchart of a headphone state detection method according to an embodiment of the present invention.

FIG. 11 is a flowchart of a headphone state detection method according to an embodiment of the present invention. In some embodiments, the codes and related parameters thereof are as recorded in Table (1), the first preset time interval is 0.1 seconds, and the second preset time interval is 0.1 seconds. Referring to FIGS. 4 and 11 together, the signal processor 101 performs steps S1101 to S1105 in step S1002 after completing steps S701 and S1001. In step S1101, the signal processor 101 determines whether these first time differences are all greater than first preset time. If YES, it indicates that the headphone 100 is kept at a fixed distance from the object 203. Therefore, in step S1002, the signal processor 101 determines that the headphone 100 is unworn. In some embodiments of the present invention, the first preset time is 90 µs.

If the signal processor 101 determines that the first time differences are not all greater than the first preset time in step S1101, it indicates that one of the first time differences is less than the first preset time (logically, if the signal processor 101 determines that the first time differences are not all greater than the first preset time, it indicates that one of the first time differences is less than or equal to the first preset time; but the time difference is usually stored and calculated by the signal processor 101 in form of floating point number, so the condition that one of the first time differences is equal to the first preset time is not considered), indicating that the distance between the headphone 100 and the object 203 is changing. Therefore, in step S1103, a changing condition of the distance between the headphone 100 and the object 203 is further determined. If the first time differences include a starting first time difference and a last first time difference after the starting first time difference according to the playing sequence, the last first time difference being greater than the starting first time difference, it indicates that the headphone 100 is getting away from the object 203, so that the signal processor determines in step S1104 that the wearing state of the headphone 100 is getting away from ear. On the contrary, if there is no starting first time difference and last first time difference after the starting first time difference, the last first time difference being greater than the starting first time difference, it indicates that the headphone 100 is getting close to the object 203, so that the signal processor determines in step S1105 that the wearing state of the headphone 100 is being worn.

In some embodiments, after the signal processor 101 determines that the first time differences are not all greater than the first preset time in step S1101, the signal processor 101 further determines a changing condition of a distance between the headphone 100 and the object 203. If the first time differences include a starting first time difference and a last first time difference after the starting first time difference according to the playing sequence, the last first time difference being less than the starting first time difference, it indicates that the headphone 100 is getting close to the object 203, so that the signal processor determines that the wearing state of the headphone is being worn. On the contrary, if there is no starting first time difference and last first time difference after the starting first time difference, the last first time difference being less than the starting first time difference, it indicates that the headphone 100 is getting away from the object 203, so that the signal processor determines that the wearing state of the headphone 100 is getting away from ear.

Figure 5:
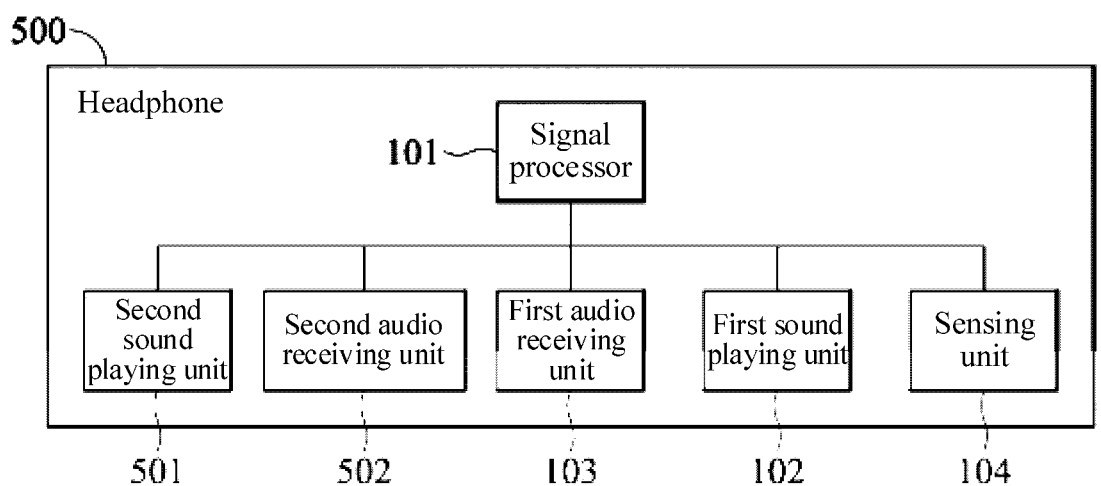
FIG. 5 is a block diagram of a headphone system according to an embodiment of the present invention.
Figure 6:
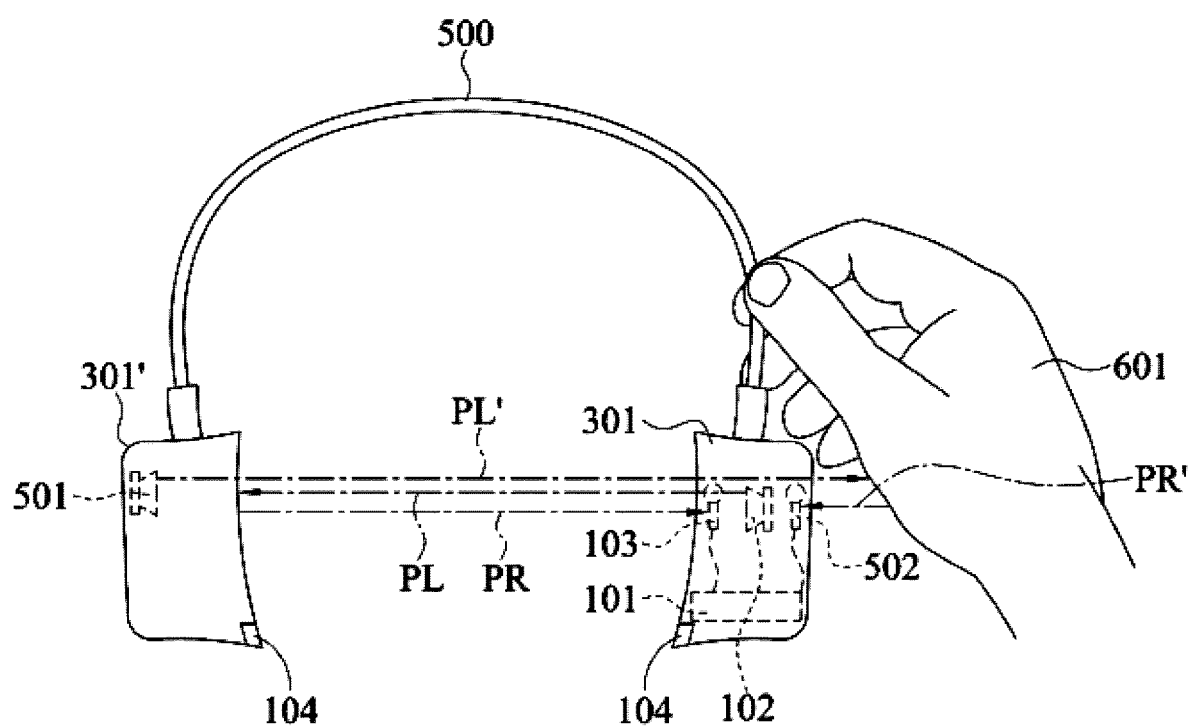
FIG. 6 is a schematic diagram of operation of a headphone according to an embodiment of the present invention.

FIG. 5 is a block diagram of a headphone system according to an embodiment of the present invention. FIG. 6 is a schematic diagram of operation of a headphone according to an embodiment of the present invention. Referring to FIGS. 5 and 6 together, a headphone 500 in FIG. 5 further includes a second sound playing unit 501 and a second audio receiving unit 502. The second sound playing unit 501 is an existing loudspeaker of the headphone. The second audio receiving unit 502 is an existing feedforward microphone of the headphone with an ANC system. The second sound playing unit 501 is arranged in a headphone housing 301'. In some embodiments, the first sound playing unit 102 and the first audio receiving unit 103 are on one side of the headphone, and the second sound playing unit 501 and the second audio receiving unit 502 are on the other side of the headphone. For example, the first sound playing unit 102 and the first audio receiving unit 103 are on a headphone housing 301 corresponding to the right ear, and the second sound playing unit 501 and the second audio receiving unit 502 are on a headphone housing 301' corresponding to the left ear.

In general, like the first sound playing unit 102, the second sound playing unit 501 plays a headphone audio signal which may be generated by an audio source during audio playing of various devices. The second audio receiving unit 502 is arranged opposite to the first sound playing unit 102. The second audio receiving unit 502 samples an environmental acoustic signal.

The signal processor 101 sends the code information to the second sound playing unit 501 according to codes 1A, 1B . . . 10F. The second sound playing unit 501 injects a corresponding audio signal into the headphone audio signal according to the received code information. For example, the signal processor 101 sends the code information corresponding to code 2A to the second sound playing unit 501, and the second sound playing unit 501 injects an audio signal of 45 kHz into the headphone audio signal after receiving the code information corresponding to code 2A.

Figure 12:
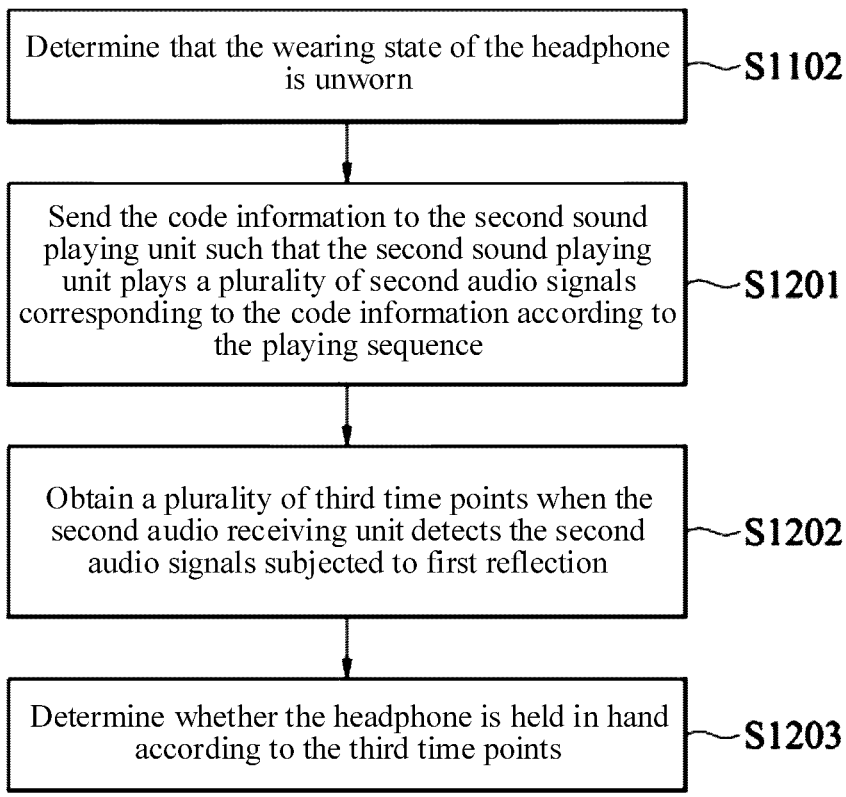
FIG. 12 is a flowchart of a headphone state detection method according to an embodiment of the present invention.

FIG. 12 is a flowchart of a headphone state detection method according to an embodiment of the present invention. References are made to FIGS. 5, 6, and 12.

In step S1102, the signal processor 101 determines that the headphone 500 is unworn. In such case, the state of the headphone 500 is shown in FIG. 6, and the audio signal (such as the above-mentioned audio signal of 45 kHz) sent by the second sound playing unit 501 is propagated through a path PL'. Since the headphone 500 is unworn, the audio signal sent by the second sound playing unit 501 may be reflected through a path PR' after encountering an object 601. When sampling the environmental acoustic signal, the second audio receiving unit 502 transmits the sampled acoustic signal to the signal processor 101. The signal processor 101 detects the audio signal subjected to reflection in the environmental acoustic signal from the second audio receiving unit 502, and obtains a time point when the second audio receiving unit 502 receives the audio signal subjected to reflection.

In step S1201, the signal processor 101 sends the code information to the second sound playing unit 501 at a first preset time interval according to a playing sequence of 1A, 1B . . . 1F. In this embodiment, the first preset time interval is 0.1 seconds. The second sound playing unit 501 injects a corresponding audio signal into the headphone audio signal according to the received code information so as to play a plurality of second audio signals corresponding to the code information. After a second preset time interval, the signal processor 101 sends code information to the second sound playing unit 501 at the first preset time interval according to a playing sequence of 2A, 2B . . . 2F. In this embodiment, the second preset time interval is 0.1 seconds. The signal processor 101 repeats this process until code information corresponding to all codes is transmitted to the second sound playing unit 501.

In step S1202, the second audio receiving unit 502 transmits the sampled acoustic signal to the signal processor 101. The signal processor 101 detects the audio signal subjected to reflection in the environmental acoustic signal from the second audio receiving unit 502, and obtains a plurality of third time points when the second audio receiving unit 502 receives these second audio signals subjected to first reflection.

In step S1203, the signal processor 101 determines whether the headphone 500 is held in hand according to the third time points.

In some embodiments, the signal processor 101 determines that the headphone 500 is held in hand in response to that time intervals between the third time points are the same.

Figure 13:
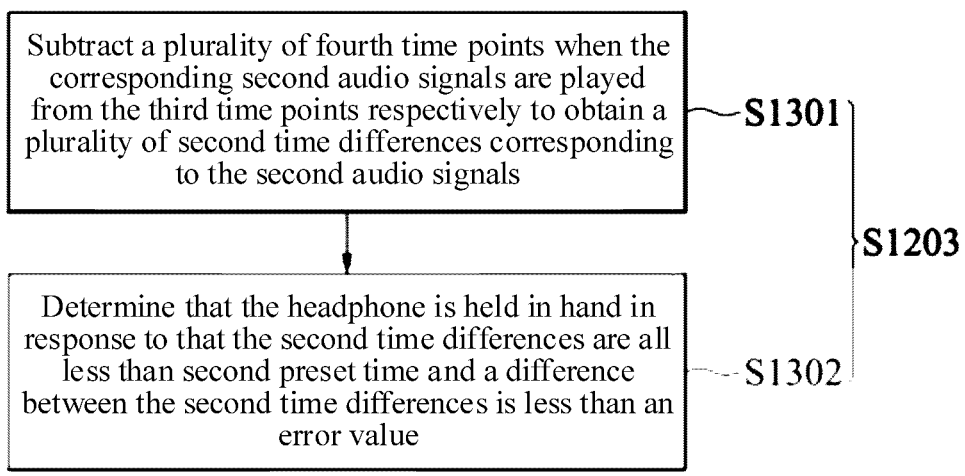
FIG. 13 is a flowchart of a headphone state detection method according to an embodiment of the present invention.

FIG. 13 is a flowchart of a headphone state detection method according to an embodiment of the present invention. Referring to FIG. 13, in some embodiments, step S1203 further includes steps S1301 and S1302. In step S1301, when sending the code information corresponding to codes 1A, 1B . . . 10F, the signal processor 101 stores a plurality of fourth time points when the code information is sent, and then subtracts the fourth time points corresponding to the same code from the third time points respectively to obtain a plurality of second time differences.

In step S1302, the signal processor 101 determines whether the headphone 500 is held in hand according to the second time differences.

If the first time differences are all less than second preset time and the second time differences are substantially the same as each other, it indicates that the headphone 500 is kept at a preset distance from the object 601, and it may be determined that the headphone 500 is held in hand. Therefore, the signal processor 101 determines that the headphone 500 is held in hand in response to that the second time differences are all less than the second preset time and a difference between the second time differences is less than an error value. In this embodiment, the second preset time is 900 μs. It is to be noted that the second preset time is set according to positions where the second sound playing unit 501 and second audio receiving unit 502 in the headphone 500 are actually arranged, and the present invention is not limited thereto.

Referring back to FIG. 1, in some embodiments of the present invention, the signal processor 101 pre-stores patterns of the spectrum of the reflected test audio signal in various states according to the test audio signal played by the first sound playing unit 102. The signal processor 101 is configured to send, in response to that the contact state is in no contact, test information of a test signal to the first sound playing unit 102 such that the first sound playing unit 102 plays the test audio signal. The signal processor 101 compares the spectrum of the reflected test audio signal received by the first audio receiving unit 103 with the pre-stored patterns of the spectrum of the reflected test audio signal in various states of the headphone 100, thereby determining the wearing state of the headphone 100. Therefore, the signal processor 101 may determine the wearing state of the headphone 100 according to the spectrum of the reflected test audio signal received by the first audio receiving unit 103.

The various states of the headphone 100 include getting away from ear, being worn, held in hand, and placed on desk.

In this embodiment, the headphone state detection method includes the following steps. The signal processor 101 receives a sensed signal sensed by the sensing unit 104 so as to determine a contact state of the headphone 100. The signal processor 101 receives the sensed signal generated by the sensing unit 104, and determines the contact state of the headphone 100 based on the sensed signal so as to determine whether the headphone 100 is in contact with an object. In response to that the contact state is in no contact, the signal processor 101 sends test information to the first sound playing unit 102 such that the first sound playing unit 102 plays a test audio signal, and the signal processor 101 determines a state of the headphone 100 according to a spectrum of the reflected test audio signal received by the first audio receiving unit 103.

In some embodiments of the present invention, the test signal includes at least one single-frequency signal (such as audios of 45 kHz, 75 kHz, 85 kHz, and 95 kHz in the above-mentioned embodiment, in such case, the test information includes information of the audios of 45 kHz, 75 kHz, 85 kHz, and 95 kHz). That is, the test audio signal played by the first sound playing unit 102 includes the at least one single-frequency signal (such as the audios of 45 kHz, 75 kHz, 85 kHz, and 95 kHz in the above-mentioned embodiment). The signal processor 101 pre-stores spectra of the reflected test audio signal in various states according to the test audio signal including the at least one single-frequency signal. Each of the spectra of the reflected test audio signal in the various states includes an amplitude corresponding to a frequency (such as the above-mentioned 45 kHz, 75 kHz, 85 kHz, and 95 kHz) of each single-frequency signal. The signal processor 101 determines the state of the headphone 100 based on the spectrum of the reflected test audio signal received by the first audio receiving unit 103 and the pre-stored spectra of the reflected test audio signal in the various states.

Since both the pre-stored spectrum of the reflected test audio signal in a specific state and the spectrum of the reflected test audio signal received by the first audio receiving unit 103 include single-frequency signals of the same frequency, in some embodiments of the present invention, the signal processor 101 determines a sum of absolute values of amplitude differences corresponding to the frequencies (such as the above-mentioned 45 kHz, 75 kHz, 85 kHz, and 95 kHz) as a distance between the spectrum of the reflected test audio signal and the pre-stored spectrum of the reflected test audio signal in this state. For example, the pre-stored spectrum of the reflected test audio signal in state "placed on desk" is as follows: the amplitude corresponding to 45 kHz is 3, the amplitude corresponding to 75 kHz is 5, the amplitude corresponding to 85 kHz is 2, and the amplitude corresponding to 95 kHz is 2, and the spectrum of the reflected test audio signal received by the first audio receiving unit 103 is as follows: the amplitude corresponding to 45 kHz is 2.5, the amplitude corresponding to 75 kHz is 4, the amplitude corresponding to 85 kHz is 3, and the amplitude corresponding to 95 kHz is 4. In such case, the distance between the spectrum of the reflected test audio signal received by the first audio receiving unit 103 and the pre-stored spectrum of the reflected test audio signal in state "placed on desk" is |3−2.5|+|5−4|+|2−3|+|2−4|=4.5. The signal processor 101 selects the spectrum at the minimum distance from the spectrum of the reflected test audio signal received by the first audio receiving unit 103 from the pre-stored spectra of the reflected test audio signal in the various states based on the above-mentioned distance definition, and determines that the state of the headphone 100 is the state corresponding to the spectrum at the minimum distance (for example, if the distance between the spectrum of the reflected test audio signal received by the first audio receiving unit 103 and the pre-stored spectrum of the reflected test audio signal in state "placed on desk" is minimum, the signal processor 101 determines that the state of the headphone 100 is "placed on desk").

In this specification, a "computer-readable medium" refers to a non-volatile non-transitory medium, such as a Read Only Memory (ROM), a flash memory, a floppy disk, a hard disk, a CD, a Digital Versatile Disc (DVD), a portable disk, a database accessible for a network, or any other storage medium known to those of ordinary skill in the art the present invention belongs to and having the same function. Such a computer-readable medium and computer-readable storage media of various other forms may involve loading of one or more instructions or multiple sequences to the signal processor 101 for execution. Such an instruction embodied in the medium is generally referred to as a "computer program code" or "computer program product". The "computer program code" or "computer program product" may be a file that may be transmitted on the network, or may be stored in a non-transitory computer-readable storage medium. These instructions may be executed such that the signal processor 101 may execute the steps or functions described in the present invention.

Based on the above, some embodiments of the present invention provide a headphone and a headphone state detection method. When the sensing unit senses that the headphone is in contact, whether the headphone is worn by the person is determined according to the test audio signal and the spectrum of the reflected test audio signal received by the first audio receiving unit. When the sensing unit senses that the headphone is in no contact, the wearing state of the headphone is determined according to the plurality of first time points when the first audio receiving unit receives the first audio signals subjected to first reflection. Therefore, the state of the headphone may be determined effectively, and mistaken contacts of the sensing unit and the power consumption of the whole headphone may be reduced. Some embodiments of the present invention provide a headphone whose state may be determined based on the spectrum of the reflected test audio signal received by the first audio receiving unit. Some embodiments of the present invention provide a headphone and a headphone state detection method. The loudspeaker and microphone with the ANC system, that any headphone has, are used as the first sound playing unit and the first audio receiving unit, so that additional increase of the cost or complexity of the headphone is avoided.

Certainly, the present invention may have many other embodiments. Those skilled in the art can make various corresponding variations and transformations without departing from the spirit and essence of the present invention, but these corresponding variations and transformations shall fall within the scope of protection of the claims of the present invention.

What is claimed is:

1. A headphone, comprising:
   a first sound playing unit, configured to execute an operation of playing, in response to receiving a plurality of pieces of code information, a plurality of first audio signals corresponding to the code information according to a playing sequence;
   a first audio receiving unit;
   a sensing unit, configured to generate a sensed signal; and
   a signal processor, configured to execute operations of:
      determining a contact state based on the sensed signal;
      in response to that the contact state is in no contact, sequentially sending the code information; determining a wearing state of the headphone according to a plurality of first time points when the first audio receiving unit receives the first audio signals subjected to first reflection, wherein any two pieces of continuously sent code information among the code information are in correspondence to different frequencies; and in response to that the contact state is in contact, stopping sending the code information.

2. The headphone according to claim 1, wherein the first sound playing unit is further configured to execute an operation of playing a test audio signal in response to receiving test information; and the signal processor is further configured to execute, in response to that the contact state is in contact, operations of sending the test information, and determining whether the headphone is worn by a person according to the test audio signal and a spectrum of a reflected test audio signal received by the first audio receiving unit.

3. The headphone according to claim 2, wherein the test audio signal comprises at least one single-frequency signal; and the signal processor determines whether the headphone is worn by a person based on at least one amplitude corresponding to at least one frequency of the at least one single-frequency signal and at least one amplitude in the spectrum of the reflected test audio signal corresponding to the at least one frequency of the at least one single-frequency signal.

4. The headphone according to claim 3, wherein the signal processor calculates at least one amplitude change corresponding to the at least one single-frequency signal based on the at least one amplitude corresponding to the at least one frequency of the at least one single-frequency signal and the at least one amplitude in the spectrum of the reflected test audio signal corresponding to the at least one frequency of the at least one single-frequency signal, and determines whether the headphone is worn by a person according to the at least one amplitude change.

5. The headphone according to claim 1, wherein the signal processor is further configured to subtract a plurality of second time points when the corresponding first audio signals are played from the first time points respectively to obtain a plurality of first time differences corresponding to the first audio signals; and then the signal processor determines the wearing state of the headphone according to changes of the first time differences.

6. The headphone according to claim 5, wherein the signal processor determines that the wearing state of the headphone is being worn in response to that any one of the first time differences is less than first preset time and a last first time difference in the first time differences is less than a starting first time difference in the first time differences; or the signal processor determines that the wearing state of the headphone is getting away from ear in response to that any one of the first time differences is less than the first preset time and the last first time difference in the first time differences is greater than the starting first time difference in the first time differences, wherein the starting first time difference is before the last first time difference according to the playing sequence.

7. The headphone according to claim 5, wherein the signal processor determines that the wearing state of the headphone is unworn in response to that the first time differences are all greater than first preset time.

8. The headphone according to claim 7, further comprising a second sound playing unit and a second audio receiving unit, wherein the second sound playing unit receives the code information sent by the signal processor; the second sound playing unit plays a plurality of second audio signals corresponding to the code information according to the playing sequence; after the signal processor determines that the wearing state of the headphone is unworn, the signal processor obtains a plurality of third time points when the second audio receiving unit receives the second audio signals subjected to first reflection; and the signal processor determines whether the headphone is held in hand according to the third time points.

9. The headphone according to claim 8, wherein the signal processor is further configured to subtract a plurality of fourth time points when the corresponding second audio signals are played from the third time points respectively to obtain a plurality of second time differences corresponding to the second audio signals; and the signal processor determines that the headphone is held in hand in response to that the second time differences are all less than second preset time.

10. The headphone according to claim 1, wherein the signal processor is further configured to sequentially send, according to a plurality of time codes, the code information corresponding to each time code of the time codes, wherein the code information corresponding to the same time code are in correspondence to different frequencies respectively.

11. A headphone state detection method, applied to a headphone, the headphone comprising a first sound playing unit, a first audio receiving unit, a sensing unit, and a signal processor, wherein the headphone state detection method comprises the following steps performed by the signal processor:
(a) receiving a sensed signal generated by the sensing unit, and determining a contact state based on the sensed signal;
(b) in response to that the contact state is in no contact, sequentially sending a plurality of pieces of code information to the first sound playing unit such that the first sound playing unit plays a plurality of first audio signals corresponding to the code information according to a playing sequence, and determining a wearing state of the headphone according to a plurality of first time points when the first audio receiving unit receives the first audio signals subjected to first reflection, wherein any two pieces of continuously sent code information among the code information are in correspondence to different frequencies, and
(c) in response to that the contact state is in contact, stopping sending the code information.

12. The headphone state detection method according to claim 11, wherein step (c) further comprises: in response to that the contact state is in contact, sending test information to the first sound playing unit such that the first sound playing unit plays a test audio signal, and determining whether the headphone is worn by a person according to the test audio signal and a spectrum of a reflected test audio signal received by the first audio receiving unit.

13. The headphone state detection method according to claim 12, wherein the test audio signal comprises at least one single-frequency signal; and step (c) further comprises: (c1) determining whether the headphone is worn by a person based on at least one amplitude corresponding to at least one frequency of the at least one single-frequency signal and at least one amplitude in the spectrum of the reflected test audio signal corresponding to the at least one frequency of the at least one single-frequency signal.

14. The headphone state detection method according to claim 13, wherein step (c1) further comprises:
(c11) calculating at least one amplitude change corresponding to the at least one single-frequency signal based on the at least one amplitude corresponding to the at least one frequency of the at least one single-frequency signal and the at least one amplitude in the spectrum of the reflected test audio signal corresponding to the at least one frequency of the at least one single-frequency signal; and
(c12) determining whether the headphone is worn by a person according to the at least one amplitude change.

15. The headphone state detection method according to claim 11, wherein step (b) further comprises:
(b1) subtracting a plurality of second time points when the corresponding first audio signals are played from the first time points respectively to obtain a plurality of first time differences corresponding to the first audio signals; and
(b2) determining the wearing state of the headphone according to changes of the first time differences.

16. The headphone state detection method according to claim 15, wherein step (b2) further comprises: determining, by the signal processor, that the wearing state of the headphone is being worn in response to that any one of the first time differences is less than first preset time and a last first time difference in the first time differences is less than a starting first time difference in the first time differences; or determining, by the signal processor, that the wearing state of the headphone is getting away from ear in response to that any one of the first time differences is less than the first preset time and the last first time difference in the first time differences is greater than the starting first time difference in the first time differences, wherein the starting first time difference is before the last first time difference in the playing sequence.

17. The headphone state detection method according to claim 15, wherein step (b2) further comprises:
determining that the wearing state of the headphone is unworn in response to that the first time differences are all greater than first preset time.

18. The headphone state detection method according to claim 17, wherein the headphone comprises a second sound playing unit and a second audio receiving unit, and the headphone state detection method further comprises:
- (d) sending the code information to the second sound playing unit such that the second sound playing unit plays a plurality of second audio signals corresponding to the code information according to the playing sequence;
- (e) after the wearing state of the headphone is determined to be unworn, obtaining a plurality of third time points when the second audio receiving unit receives the second audio signals subjected to first reflection; and
- (f) determining whether the headphone is held in hand according to the third time points.

19. The headphone state detection method according to claim 18, wherein step (f) further comprises:
- (f1) subtracting a plurality of fourth time points when the corresponding second audio signals are played from the third time points respectively to obtain a plurality of second time differences corresponding to the second audio signals; and
- (f2) determining that the headphone is held in hand in response to that the second time differences are all less than second preset time and a difference between the second time differences is less than an error value.

* * * * *